(12) United States Patent
Prigge et al.

(10) Patent No.: US 8,886,353 B2
(45) Date of Patent: Nov. 11, 2014

(54) SATISFYING A REQUEST FOR A PHYSICAL IMPORT/EXPORT SLOT WITH A SLOT THAT IS NOT A PHYSICAL IMPORT/EXPORT SLOT

(75) Inventors: Carsten H. Prigge, Parker, CO (US); Roderick B. Wideman, Shakopee, MN (US); Chris Cason, Aurora, CO (US); Darrel Somer, Centennial, CO (US); Brian Sunnen, Castle Rock, CO (US); Jeffrey Szmyd, Highlands Ranch, CO (US)

(73) Assignee: Quantum Corporation, San Jose, CA (US)

( * ) Notice: Subject to any disclaimer, the term of this patent is extended or adjusted under 35 U.S.C. 154(b) by 674 days.

(21) Appl. No.: 12/506,438

(22) Filed: Jul. 21, 2009

(65) Prior Publication Data

US 2011/0022760 A1 Jan. 27, 2011

(51) Int. Cl.
*G06F 7/00* (2006.01)
*G06F 3/06* (2006.01)

(52) U.S. Cl.
CPC ............ *G06F 3/0664* (2013.01); *G06F 3/0686* (2013.01); *G06F 3/0607* (2013.01)

USPC ........... 700/214; 711/112; 711/114; 711/148; 711/153; 711/170

(58) Field of Classification Search
USPC .................................................. 700/213–230
See application file for complete search history.

(56) References Cited

U.S. PATENT DOCUMENTS

| | | | |
|---|---|---|---|
| 6,240,467 B1 * | 5/2001 | Beardsley et al. ................ 710/5 |
| 6,338,006 B1 * | 1/2002 | Jesionowski et al. .......... 700/214 |
| 2002/0007445 A1 * | 1/2002 | Blumenau et al. ............. 711/153 |
| 2003/0050729 A1 * | 3/2003 | Basham et al. ................ 700/214 |
| 2003/0084240 A1 * | 5/2003 | Torrey et al. .................. 711/114 |
| 2005/0013149 A1 * | 1/2005 | Trossell ............................ 365/1 |
| 2005/0043852 A1 * | 2/2005 | Gallo et al. .................... 700/214 |
| 2005/0080992 A1 * | 4/2005 | Massey et al. ................. 711/114 |
| 2005/0267627 A1 * | 12/2005 | Lantry et al. .................. 700/214 |
| 2007/0022240 A1 * | 1/2007 | Gallo et al. ....................... 711/4 |

* cited by examiner

*Primary Examiner* — Gene Crawford
*Assistant Examiner* — Kyle Logan
(74) *Attorney, Agent, or Firm* — Baker Botts L.L.P.

(57) ABSTRACT

A request for a physical import/export (I/E) slot is satisfied using a tape library slot that is not a physical I/E slot. According to one embodiment, the request for the physical I/E slot, that is associated with the tape library, is received. A different slot, which is not any of the physical I/E slots associated with the tape library, is used to satisfy the request.

3 Claims, 9 Drawing Sheets

Table 640

| Rows | Element Type | Logical Library | Physical Library 500 |
|---|---|---|---|
| 651 | Storage | LL_stElement A | Slot 510A |
| 652 | | LL_stElement B | Slot 510G |
| 653 | | LL_stElement C | Slot 510B |
| 654 | | LL_stElement D | Slot 510H |
| 655 | | LL_stElement E | Slot 510C |
| 656 | | LL_stElement F | Slot 510I |
| 657 | Import/Export | | |
| 658 | | LL_ieElement A | N/A |
| 659 | | LL_ieElement B | N/A |
| 660 | | LL_ieElement C | N/A |
| 661 | | LL_ieElement D | N/A |
| 662 | | LL_ieElement E | N/A |
| 663 | | LL_ieElement F | N/A |
| 664 | | N/A | I/E Slot 520A |
| 665 | | N/A | I/E Slot 520B |
| 666 | | N/A | I/E Slot 520C |
| 667 | Tape Drive | | |
| 668 | | LL_drElement A | Tape Drive 592 |

Column labels: 641, 642, 643, 644

FIG. 6

Table 710

| Operation | LL_stElement B | Storage Slot 510G | LL_ieElement A |
|---|---|---|---|
| 715 - initial | Bound to Storage Slot 510G | Contains tape, Full | Virtualized – Unbound, Empty |
| 716 – virtually move from LL_stElement B to LL_ieElement A | | Contains tape, Full | |
| 717 – Move command completed virtually | Bound to Storage Slot 510G, Empty, accessible | Contains tape, Full | Bound to Storage Slot 510G, Full, accessible |

Table 720

| Operation | LL_stElementB | Storage Slot 510G | LL_ieElementA | I/E Slot 520C |
|---|---|---|---|---|
| 715 - initial | Bound to Storage Slot 510G, Full, accessible | Contains tape, Full | Virtualized, Unbound, Empty | Empty |
| 716 – virtually move from LL_stElementB to LL_ieElementA | | Contains tape, Full | | Empty |
| 717 – Move command completed virtually | Bound to Storage Slot 510G, Empty, accessible | Contains tape, Full | Bound to Storage Slot 510G, Full, accessible | Empty |
| 726 – physically move from physical storage 510G slot to physical I/E slot 520G | | Empty | | Tape being placed |
| 727 - Auto-move complete | Bound to Storage Slot 510G, Empty, accessible | Empty | Bound to I/E Slot 520C, Full, accessible | Contains tape, Full |
| 728 – Tape removed | Bound to Storage Slot 510G, Empty, accessible | | Unbound, Empty | Empty |

FIG. 7

SATISFYING A REQUEST FOR A PHYSICAL IMPORT/EXPORT SLOT WITH A SLOT THAT IS NOT A PHYSICAL IMPORT/EXPORT SLOT

BACKGROUND

Referring to FIGS. 1 and 2, tape libraries 100 are typically mechanical devices that include a multitude of tapes for storing data. A tape library 100 includes slots 110A-110L (commonly known as "storage elements") for storing tapes, and tape drives 192, 194 ("data transfer elements") for reading data from and writing data to the tape library 100's tapes. The tape library 100 also includes an apparatus (commonly known as a "medium transport element"), such as a robot, for moving tapes around the tape library 100. For example the robot could retrieve a tape from its slot 110A-110L and insert the retrieved tape into a tape drive 192, 194 when an application 131, 132, 141, 142 requests to access the tape. The robot would then return the tape to a slot 110A-110L once the request for writing the data to the tape has completed. A management apparatus, also commonly known as a library controller, associated with the tape library 100 tracks the associations between tapes and slots 110A-110L.

Various parts of the tape library 100, such as the physical storage slots 110 and the medium transport mechanism, among other things, may be inside of an enclosure 220. The tape library 100 may include a door 210 that an operator 150 can use to enter the tape library 100's enclosure 220. For a large tape library, the operator 150 may be able to walk into the enclosure 220. For a smaller tape library, the operator 150 may be able to place a hand or a finger into the enclosure 220. For safety reasons, typically, the tape library 100's functions stop when the door 210 is opened.

An import/export (I/E) station 120 is provided to enable the tape library 100 to continue operation while an operator 150 inserts or removes a tape, keeping the door 210 closed. I/E slots 120A-120F (commonly known as "I/E elements") are typically associated with an I/E station 120. An operator 150 can insert a tape by, for example, rotating the I/E station 120 outwards, placing a tape into an I/E slot 120A, and rotating the I/E station 120 inwards. To remove a tape, robotics will physically move the tape from where it is located in the tape library 100 to one of the I/E station 120's I/E slots 120A-120F. The operator 150 can remove the tape from the I/E slot 120A-120F, for example, by rotating the I/E station 120. Inserting tapes into a library 100 is commonly known as "importing" and removing a tape from a library 100 is commonly known as "exporting."

BRIEF DESCRIPTION OF THE DRAWINGS

The accompanying drawings, which are incorporated in and form a part of this specification, illustrate embodiments of the subject matter and, together with the description, serve to explain principles discussed below.

FIG. 6 depicts a mapping between logical library elements and physical library elements, according to one embodiment.

FIG. 7 depicts operations for exporting a tape, according to various embodiments.

Figure 1:
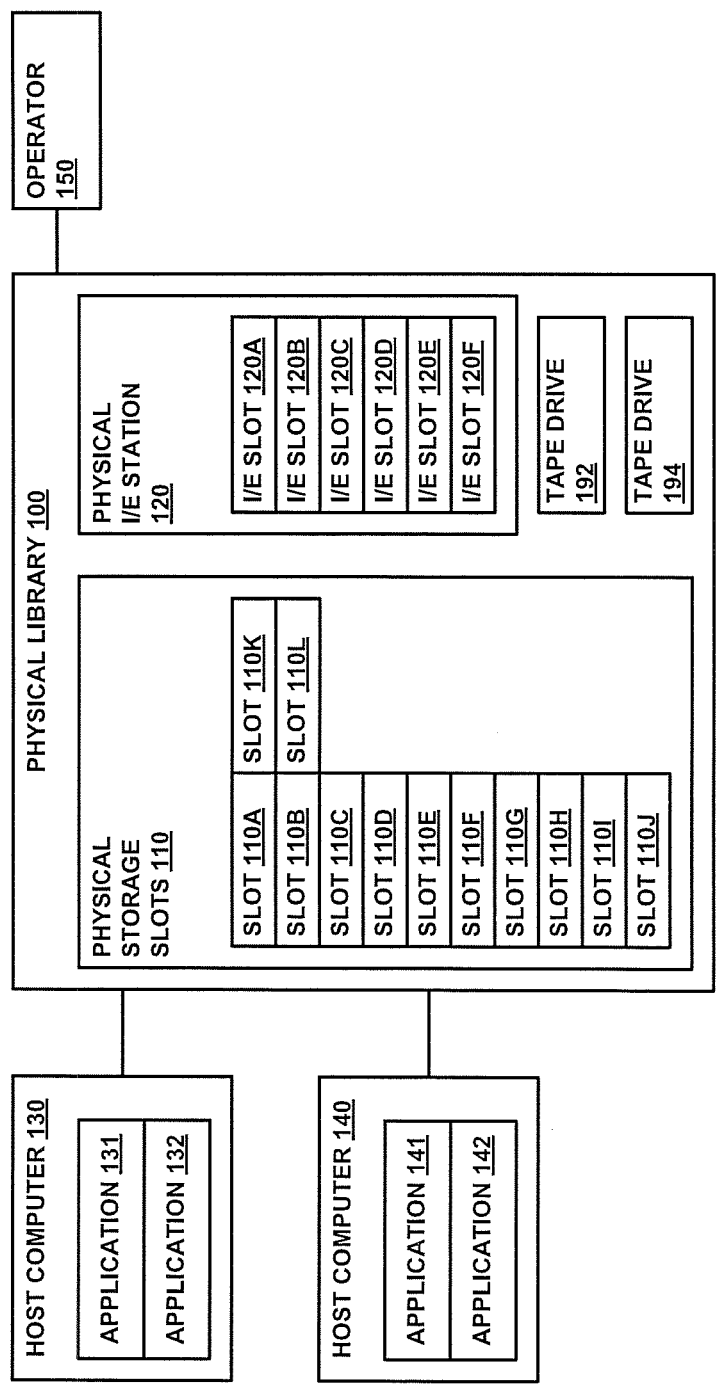
FIGS. 1 and 2 depict a physical tape library that receives commands from applications and an operator.
Figure 2:
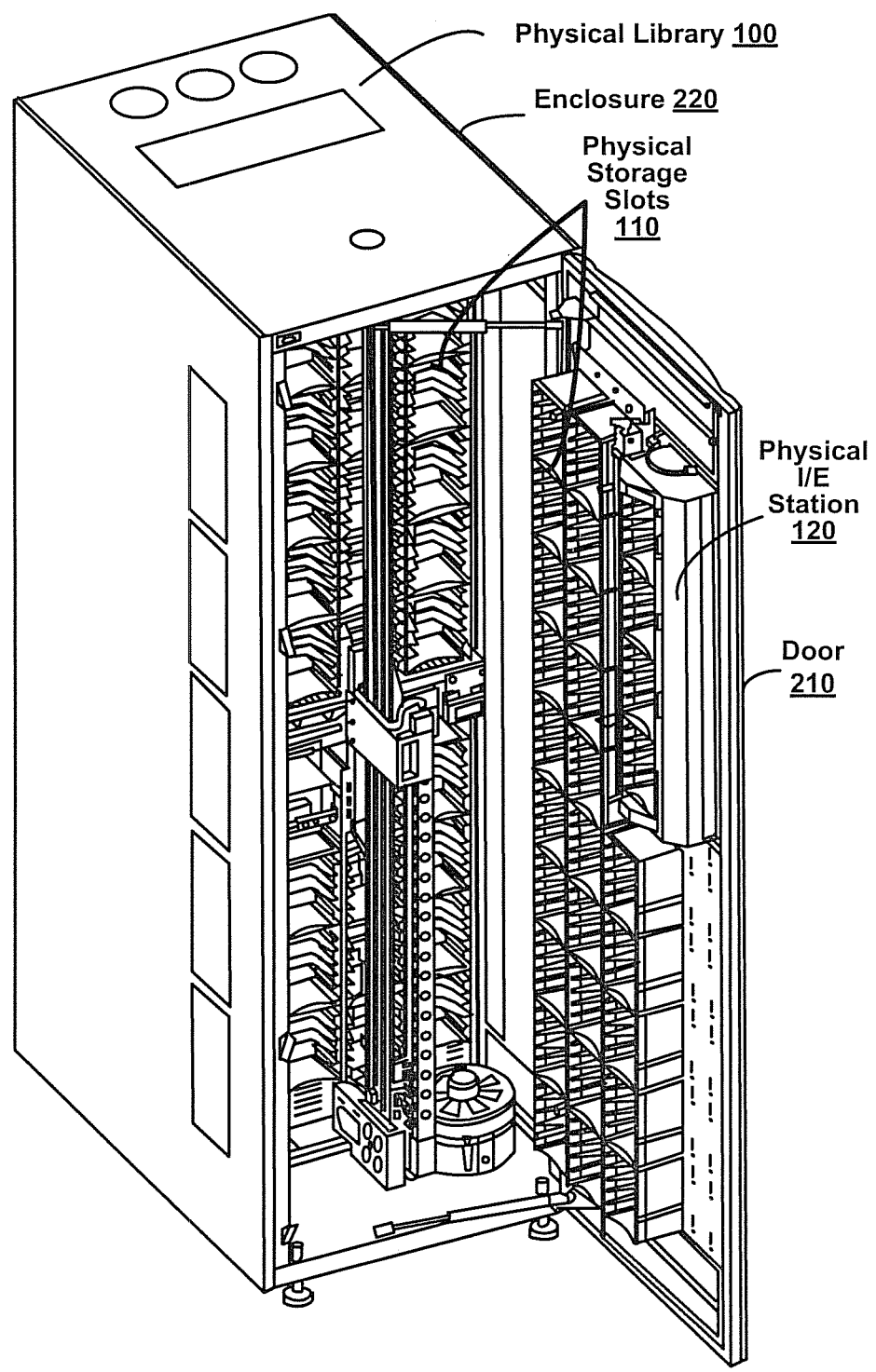

The drawings referred to in this brief description should be understood as not being drawn to scale unless specifically noted.

DESCRIPTION OF EMBODIMENTS

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the description of embodiments, discussions utilizing terms such as "receiving," "satisfying," "associating," "using," "creating," "exporting," "importing," "reporting," "transforming data," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Introduction of the Discussion

The role of tape libraries is changing. Previously tape libraries were used as the main location for storing backup data. However, in more recent times, a "hierarchy of storage" is used for backing up data. For example, data may first be backed up to disk, then migrated from the disk to a tape library after a first period of time, and migrated again from the tape library to a secure location after a second period of time. Further, data is more frequently being moved from one tape library to another tape library. Moving data between a tape library and a secure location and moving data between tape libraries involves manual movement of tapes.

An operator 150 is not always available to manually remove tapes from FE slots 120A-120F. For example, many installations operate their tape libraries without any operators 150 present during the night (also known as "lights off"). This practice may be due to attempts to reduce expenses or may be forced due to labor laws. Further, the applications 131, 132, 141, 142 will stop executing if the applications 131, 132, 141, 142 request an I/E slot 120A-120F to move a tape to when all of the I/E slots 120A-120F are occupied. Therefore, there is a need for providing enough I/E slots that applications 131, 132, 141, 142 can execute without interruption regardless of whether an operator 150 is present.

One solution has been to provide more physical I/E stations. However, buying additional physical I/E stations 120 is expensive and uses a large amount of floor space or rack space. Another solution has been to share existing I/E slots 120A-120F among multiple applications 131, 132, 141, 142. While this might provide a larger number of I/E slots for a given application 131, 132, 141, 142, an application 131, 132, 141, 142 will still stop executing when all of the I/E slots 120A-120F are occupied.

Therefore, according to one embodiment, a slot that is not a physical I/E slot is used to create an I/E slot. For example, according to one embodiment, physical storage slots are used to "extend" a physical I/E station. More specifically, a physical storage slot can be used to satisfy a request for a physical I/E slot, according to one embodiment. This embodiment is also referred to as the "I/E extension embodiment." In another example, a virtual I/E slot is created based on a logical I/E slot that is capable of being bound to physical elements, such as a physical storage slot or a physical I/E slot. The virtual I/E slot can be re-used by unbinding and rebinding the logical I/E slot to another physical element. The virtual I/E slot can be used to satisfy a request for a physical I/E slot. This embodiment is referred to as the "virtual I/E embodiment." A request, according to various embodiments, to import or export a tape may be initiated by an application or by an operator.

I/E Station

A tape library includes a medium transport mechanism, such as a robot, that moves tapes between slots and a tape drive for the purpose of accessing the tape. The robot can also be used to move tapes between various slots. A person may insert a part or all of their body into a tape library's enclosure depending on the size of the tape library. For safety reasons, the operation of the robot is stopped when the door to the tape library's enclosure is opened. Typically a tape library includes what is known as an "I/E station" to enable the tape library to continue operating while an operator inserts (also known as "importing") a tape into or removes (also known as "exporting") a tape from the tape library. The I/E station includes a number of slots (also known as "FE slots"). The I/E station may be a rotating device, that can be opened by rotating it outwards or closed by rotating it inwards. In another example, the I/E station may be a drawer that can slide to open or close it. The I/E station may also be referred to as an input/output station, a mailbox, or a cartridge access port (CAP).

Slots

Slots may be shared by applications or dedicated to an application. For example, a slot may be shared by a plurality of applications or may be dedicated to one application. A slot that is shared by a plurality of applications or dedicated to one application can be either a storage slot or an I/E slot. All or a subset of the I/E slots associated with a physical I/E station may be dedicated to operator initiated access. For example, assume that a physical I/E station includes physical I/E slots A, B, and C. All of the I/E slots A-C may be dedicated to operator initiated imports and exports, according to one embodiment. According to another embodiment, a subset, such as I/E slots A and B, may be dedicated to operator initiated imports and exports. In yet another embodiment, none of the I/E slots are dedicated for operator initiated imports and exports. Regardless of whether all, a subset, or none of the physical I/E slots are dedicated for operator initiated access, the operator may physically enter a tape library to insert or remove tapes provided that the tape library is large enough for the operator to enter. In another example, slots may be shared between one or more applications and an operator. Therefore, any slot, whether an I/E slot or a storage slot, may be shared by a plurality of applications, dedicated to an application, dedicated to operator initiated access, or shared by at least one application and an operator, according to various embodiments.

The term "physical slot" shall be used to refer to either a physical storage slot or a physical I/E slot. The term "non-physical I/E slot" shall be used to refer to any slot that is not an actual physical I/E slot and that can be used to satisfy a request for a physical I/E slot. For example, a non-physical I/E slot may be a storage slot that is used for extending the I/E station. In another example, a non-physical I/E slot is a virtual slot that is used to satisfy a request for a physical I/E slot.

Request

According to one embodiment, a "request" is a tape import request or a tape export request. The term "request initiator" shall be used to refer to the entity that initiates a request for an import or an export. Examples of request initiators include an operator and an application. According to one embodiment, a virtual I/E slot is used to satisfy a request for a physical I/E slot. According to another embodiment, an extension I/E slot is used to satisfy a request for a physical FE slot. According to one embodiment, a tape library may use any combination of a virtual I/E slot, an extension I/E slot, a non physical I/E slot, and a conventional physical I/E slot to satisfy a request.

Partitions and Logical Libraries

A partition could include slots from one or more of storage slots and I/E slots. For example, a partition may include a physical storage slot, a physical I/E slot, or both a physical storage slot and a physical I/E slot, among other things. A logical library can include logical elements that map to physical library elements. For example, a logical library may include any one or more of a logical storage slot, a logical I/E slot, and a logical tape drive. The logical storage slot and the logical I/E slot can be mapped to physical slots and the logical tape library can be mapped to a physical tape library. The physical library elements, which map to a logical library's elements, may be associated with a partition.

Library Controller

According to one embodiment, a library controller is used to track various associations in a tape library. For example, a library controller can maintain a database of which slot or disk drive a tape is in, for each tape in the tape library. The library controller may be software, hardware, firmware, or a combination thereof. The library controller may reside in the tape library's enclosure, for example, on a Printed Circuit Board Assembly (PCBA). The library controller may reside on a computer that is outside of the enclosure. The library controller is also commonly known as a "library system controller."

I/E Extensions

Figure 3:
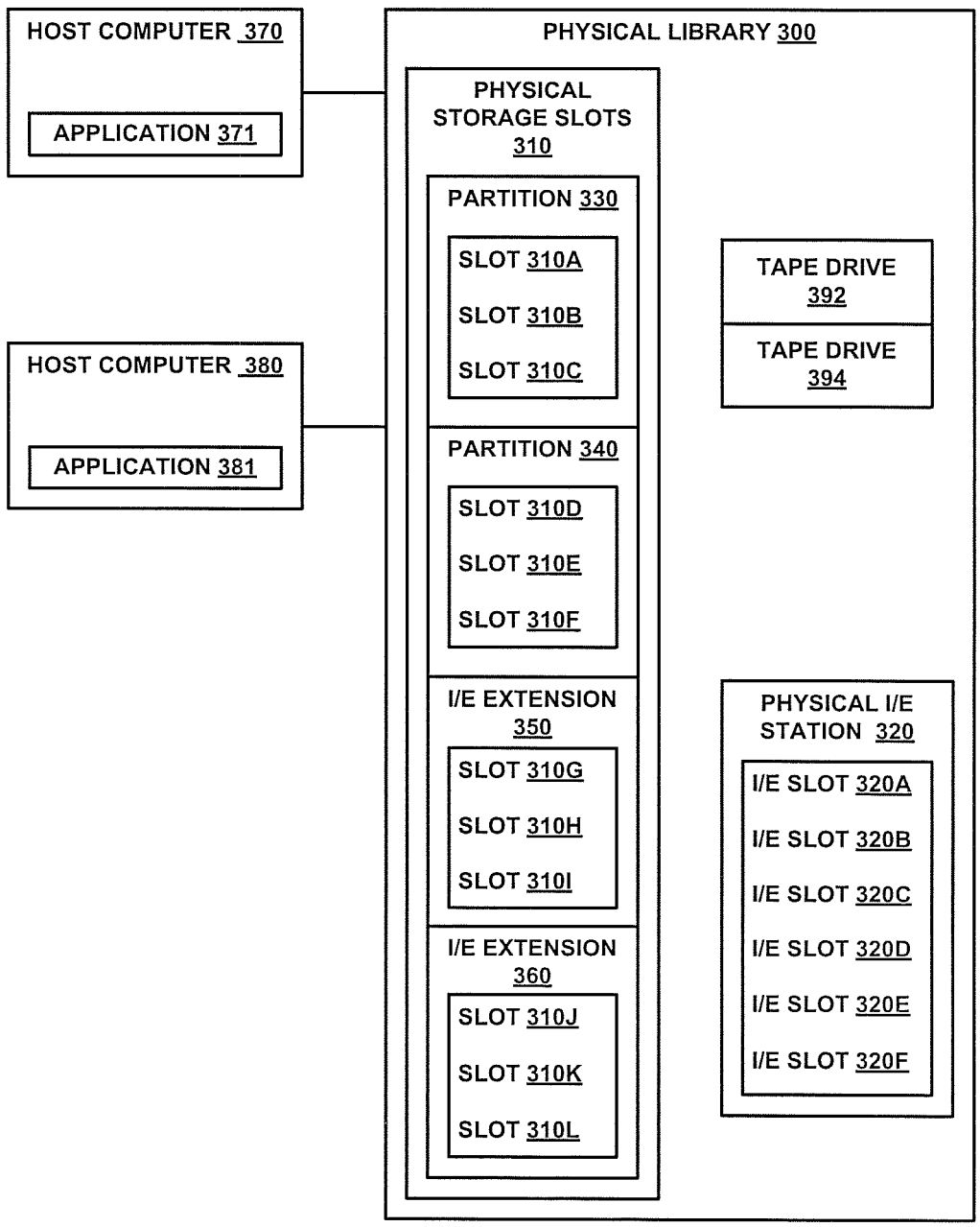
FIGS. 3, 4 and 5 depict block diagrams of physical tape libraries, according to various embodiments.
Figure 4:
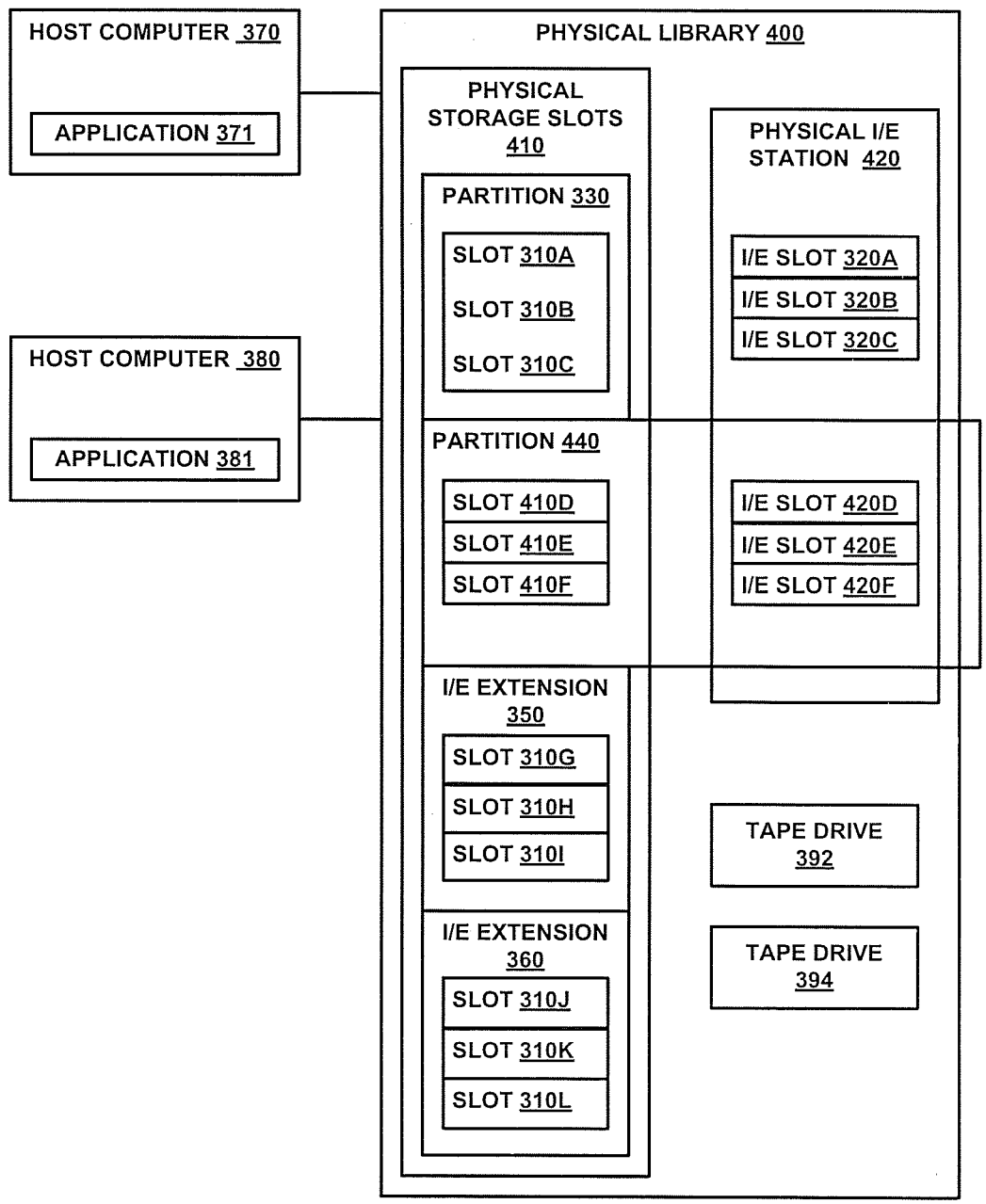

Physical storage slots, according to one embodiment, can be used for increasing the number of I/E slots that are available for importing and exporting tapes. FIGS. 3 and 4 depict block diagrams of physical libraries 300, 400 that increase the number of I/E slots using one or more I/E extensions, according to various embodiments.

FIG. 3 depicts two host computers 370, 380 and a physical library 300. The host computers 370, 380 execute respective applications 371, 381. The physical library 300 includes physical storage slots 310, a physical I/E station 320, and tape drives 392, 394. The physical storage slots 310 include slots 310A-310L. The storage slots 310A-310C and 310D-310F are associated with respective partitions 330 and 340. Partition 330 is assigned to application 371 and partition 340 is assigned to application 381. The storage slots 310G-310I and 310J-310L are associated with respective I/E extensions 350 and 360. The storage slots 310G-310I and 310J-310L associated with the I/E extensions 350, 360 shall also be referred to as "extension I/E slots." The I/E extension 350 is assigned to application 371 and the I/E extension 360 is assigned to application 381. The physical I/E station 320 includes physical I/E slots 320A-320F.

The two applications 371, 381 execute on the respective host computers 370, 380 and communicate with the physical library 300. The applications 371, 381 can request an I/E slot for the purpose of importing or exporting a tape. As depicted in FIG. 3, the physical I/E slots 320A-320F are shared (referred to herein as "shared physical I/E slots"); therefore, the physical I/E slots 320A-320F are provided on a first come first served basis, for example, to a requesting application 371, 372, or requesting operator. For example, assume that physical I/E slots 320A-320E are occupied with tapes and application 371 requests a physical I/E slot before application 381 requests an I/E slot. In this case, the first application 371 to request a physical I/E slot is provided the last physical I/E slot 320F.

Continuing the example, according to one embodiment, the second application 381 to request a physical I/E slot is provided a storage slot in order to satisfy the application 381's request. For example, application 381 is provided one of the storage slots 310J-310L associated with application 381's I/E extension 360. Similarly, any application 371, 381, according to various embodiments, is provided a storage slot 310G-310I associated with application 371, 381's respective I/E extension 350, 360 to satisfy a request when all of the physical I/E slots 310A-320F are occupied.

A physical I/E slot can be dedicated to an application (referred to herein as "dedicated physical I/E slot") by assigning the physical I/E slot to an application's logical library. FIG. 4 depicts a physical library with physical I/E slots that are assigned to an application's partition, according to one embodiment. The physical library 400 includes physical storage slots 410 and physical I/E station 420, according to one embodiment. The physical storage slots 410 are partitioned into partitions 330, 440. For the sake of illustration, assume that the partitions 330, 440 are associated with the logical libraries of respective applications 371 and 381. Physical I/E slots 420D-420F are assigned to partition 440, which are associated with application 381's logical library, and are, therefore, dedicated to application 381. The other physical I/E slots 320A-320C are shared and, therefore, can be requested by any application 371, 381 or operator.

The portion of the physical I/E station 420 that includes physical I/E slots 420D-420F that are dedicated to an application shall be referred to as the "dedicated physical portion" of the physical I/E station 420. The portion of the physical I/E station 420, which includes shared physical I/E slots 320A-320C, shall be referred to as the "shared physical portion" of the physical I/E station 420.

According to one embodiment, the number of I/E slots that are reported as available to an application 371, 381 includes extension I/E slots. For example, referring to FIG. 3 where all of the physical I/E slots 320A-320F are shared, assume that application 371 requests an I/E slot and that physical I/E slots 320A, 320C, 320E and physical I/E slot 310H are occupied. Still referring to FIG. 3, in this case, application 371 shall be informed that five I/E slots—shared physical I/E slots 320B, 320D, 320F and extension I/E slots 310G, 310I—are available. In another example, referring to FIG. 4 where physical I/E slots 320A-320C are shared and I/E slots 420D-420F are associated with partition 440, assume that shared physical I/E slot 320B, dedicated I/E slot 420E, and extension I/E slot 410E are occupied. Still referring to FIG. 4, in this case, application 371 shall be informed that six I/E slots—shared physical I/E slots 320A, 320C, dedicated physical I/E slots 420D, 420F, extension I/E slots 410D, 410F—are available.

In a third example, referring to FIG. 3, assume that physical I/E slots 310A-320C are dedicated to operator initiated access. Also assume that application 371 requests an I/E slot, and that extension I/E slot 310H and physical I/E slot 320E are occupied. Still referring to FIG. 3, in this case, application 371 will be informed that four I/E slots—extension I/E slots 310G and 310I and physical I/E slots 320D and 320F—are available.

Fragmentation

Initially, I/E elements may be grouped and identified within consecutive physical elements. For example, referring to FIG. 3, initially storage slots 310A-310C are associated with partition 330, storage slots 310D-310F are associated with partition 340, extension I/E slots 310G-310I are associated with I/E extension 350, extension I/E slots 310J-310L are associated with I/E extension 360.

According to various embodiments, a tape may be moved logically instead of physically. Therefore, as import and export operations are initiated, element types and element addresses are swapped without actually physically moving the tape. For example, referring to FIGS. 3 and 4, slot 310G may be assigned to partition 330 instead of I/E extension 350 or slot 310D may be assigned to I/E extension 360 instead of partition 340 as the result of various logical moves that result from import and/or export operations. Similarly, referring to FIG. 4, physical I/E slots can be moved between a shared physical portion of a physical I/E station 420 and a dedicated physical portion of a physical I/E station 420 as the result of various logical moves that result from import and/or export operations. More specifically, I/E slot 420D may be moved to the shared physical portion of physical I/E station 420 and I/E slot 320A may be moved to the dedicated physical portion of the physical I/E station 420.

Logical I/E Slots

According to one embodiment, a virtual I/E slot is created based on a logical I/E slot that is capable of being bound to a physical element, such as a physical storage slot or a physical I/E slot, for example. The virtual I/E slot can be re-used by unbinding the logical I/E slot from the physical element and rebinding the logical I/E slot to another physical element. The virtual I/E slot can be used to satisfy a request for a physical I/E slot. This embodiment is referred to as the "virtual I/E embodiment." More specifically, according to one embodiment, a storage slot is empty after an export operation is performed and a physical I/E slot is empty after an import operation is performed. Dynamic associations between logical elements, such as logical I/E slots, and physical elements, such as physical storage slots and physical I/E slots, can be maintained in memory using, for example, data structures. A virtual I/E slot can be used, for example, in conjunction with a single I/E station to provide large import and export areas, as will become more evident.

Figure 5:
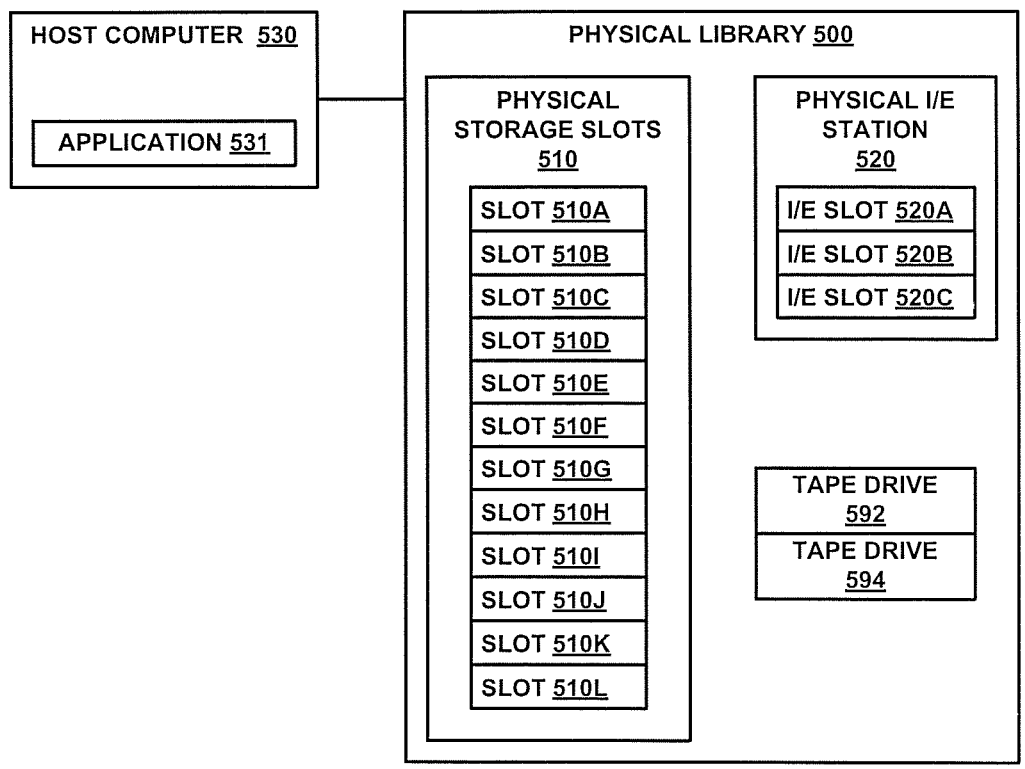

FIG. 5 depicts a block diagram of a physical library that can be used to provide virtualized I/E elements, according to various embodiments. FIG. 5 depicts a host computer 530 and a physical library 500. An application 531 is associated with the host computer 530. The physical library 500 includes physical storage slots 510, physical I/E station 520, and tape drives 592, 594. The physical storage slots 510 include storage slots 510A-510L. The physical I/E station 520 includes physical I/E slots 520A-520C.

A logical library can include logical elements that map to physical library elements. FIG. 6 depicts a mapping between logical library elements and physical library elements, according to one embodiment. Referring to FIG. 6, table 640 depicts logical elements associated with a logical library 643, physical elements of a physical library 500 that are mapped to the logical library 643's logical elements, and the element types 642 of the respective logical library 643 and the physical library 500, according to various embodiments. The table 640 also depicts columns, 641-644, and rows 651-668. The element types 642 are storage (rows 651-656), import/export (rows 658-666), and tape drive (row 668). Referring to rows 651-656, physical storage slots 510A, 510G, 510B, 510H, 510C, 510I are assigned respectively to logical storage elements (LL_stElements) A, B, C, D, E, and F. Referring to row 668, physical tape drive 592 is assigned to logical tape drive element (LL_drElement) A. As depicted in Table 640, a logical library at column 643 has been created that includes more virtual I/E elements than what would be provided by the physical library 500's physical I/E elements. For example, the logical library at column 643 has six logical I/E elements (LL_ieElements) A-F at rows 548-663 for column 643 while the physical library 500 at column 644 has three physical I/E slots 520A, 520B, 520C at rows 664-666.

Virtual I/E slots can be created by binding a logical I/E slot, by unbinding a logical I/E slot, by flagging a logical I/E slot as "virtual," or by adopting some other convention. An example of another convention includes designating a list of logical elements as "virtual" and, therefore, the designated logical elements are candidates to be bound, unbound, and re-bound to various physical elements.

According to one embodiment, the number of I/E slots that are reported as available to a request initiator, such as an application or an operator, include the logical I/E slots that are not being used to satisfy requests for physical I/E slots. For example, referring to FIG. 5, assume that the physical I/E slots 520A-520C are shared, that physical I/E slot 520B is being used to satisfy an export request and that logical I/E slots (LL_ieElements) A, B and D are currently being used to satisfy three more export requests. Assume that an operator initiates a fifth export request. In this case, the operator will be informed that five I/E slots—physical I/E slots 520A and 520C, and logical I/E elements (LL_ieElements) C, E, and F—are available to satisfy the fifth export request. Similarly, if an application 531 initiates the fifth request instead of an operator, the application 531 would be informed that five I/E slots are available to satisfy the fifth request.

In another example, assume that a request initiator requests to export a tape. Also assume that the physical I/E slots 520A-520C are dedicated for operator initiated access and that logical I/E slots (LL_ieElements) A, B and D are currently being used to satisfy three export requests. In this case, the request initiator will be informed that three I/E slots— logical I/E elements (LL_ieElements) C, E, and F—are available to satisfy the request initiator's export request.

Request

According to one embodiment, a "request" is a tape import request or a tape export request. The term "request initiator" shall be used to refer to the entity that initiates a request for an import or an export. Examples of request initiators include, among other things, an operator and an application that executes, for example, on a host (also referred to as a "host application"). According to one embodiment, a virtual I/E slot is used to satisfy a request for a physical I/E slot. According to another embodiment, an extension I/E slot is used to satisfy a request for a physical I/E slot. According to one embodiment, a tape library may use any combination of a virtual I/E slot, an extension I/E slot, and a conventional physical I/E slot to satisfy a request.

Insertion and Removal

Whether using an I/E extension embodiment or a virtual I/E embodiment, a tape, which is located in a storage slot (also referred to as a "non-physical I/E slot") that is being used to satisfy a request for exporting the tape, can be removed from a tape library in a number of ways. An operator can open the door to the tape library and manually remove the tape from the non-physical I/E slot where it resides. Alternatively, when a physical I/E slot becomes available, the medium transport mechanism can automatically move the tape from the non-physical I/E slot to the available physical I/E slot. An operator can gain access to the tape by opening the physical I/E station. As described herein, the medium transport mechanism stops moving for the duration that a tape library's door is opened, whereas, the medium transport mechanism continues operating when a tape is moved to an I/E slot while the door is closed. Whether using an I/E extension embodiment or a virtual I/E embodiment, a tape can be imported into a tape library by an operator manually entering the tape library or by a medium transport mechanism automatically placing the tape into a physical I/E station. According to one embodiment, a user interface enables an operator to cause the library to move a tape from an extended I/E slot or a virtual I/E slot to a physical I/E slot.

Illustrations of a Method

Figure 8:
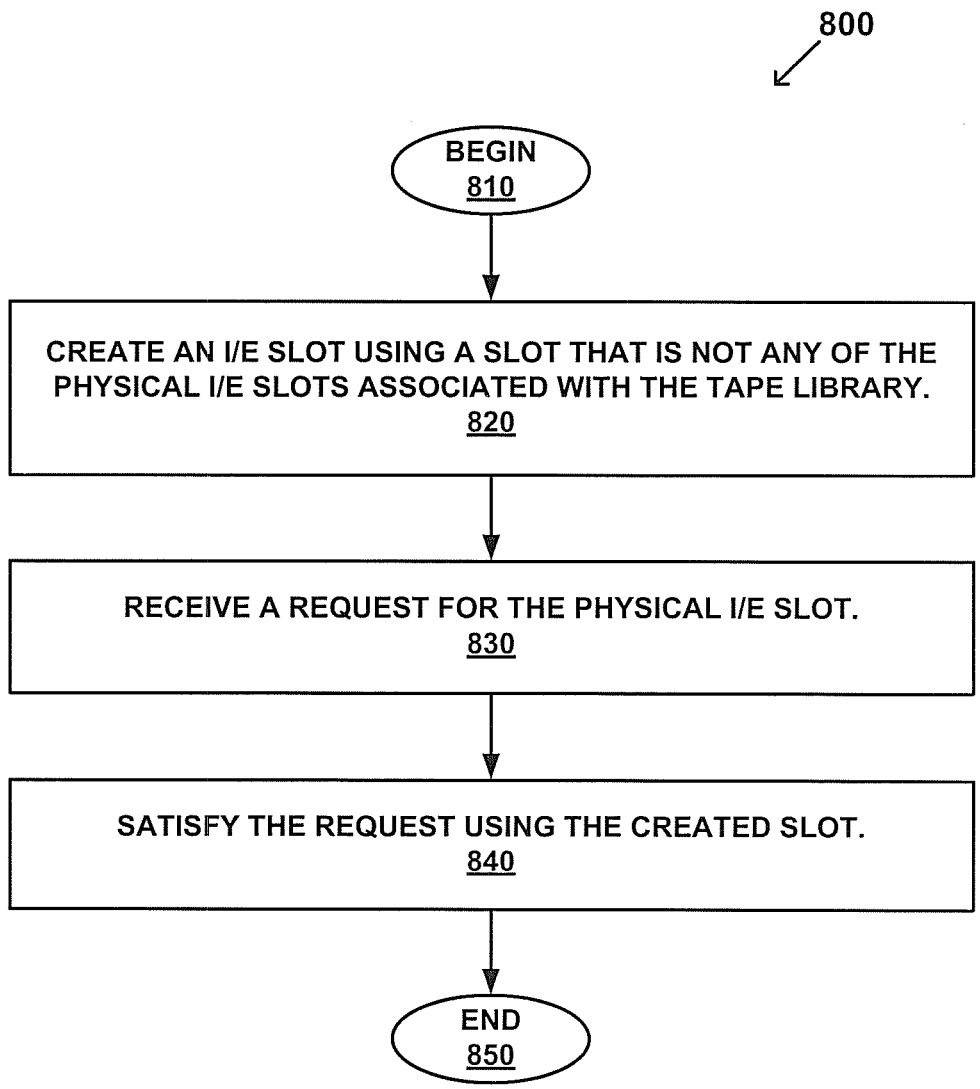
FIG. 8 depicts a flowchart of a method for satisfying a request for a physical I/E slot with a slot that is not a physical I/E slot, according to various embodiments.

FIG. 8 depicts a flowchart for a method for satisfying a request for a physical I/E slot with a slot that is not a physical I/E slot, according to various embodiments. Although specific operations are disclosed in flowchart 800, such operations are exemplary. That is, embodiments of the present invention are well suited to performing various other operations or variations of the operations recited in flowchart 800. It is appreciated that the operations in flowchart 800 may be performed in an order different than presented, and that not all of the operations in flowchart 800 may be performed.

At 810, the method begins.

At 820, an I/E slot is created using a slot that is not any of the physical I/E slots associated with the tape library. For example, referring to FIG. 3, I/E slots can be created using storage slots 310G-310L. In another example, referring to FIG. 4, I/E slots are created using storage slots 310G-310I and 410J-410L. Slots 310G-310L and 410J-410L are storage slots; and therefore, are not physical I/E slots (also known as a "non-physical I/E slots"). In yet another example, I/E slots can be virtualized where logical I/E slots are bound to physical elements to create I/E slots. The logical I/E slots can be unbound and rebound to different physical elements. More specifically, referring to Table 640 on FIG. 6, virtual I/E slots (LL_ieElements) A-F are created with out using any physical elements as indicated by the N/A on rows 658-663.

At 830, a request for a physical I/E slot is received. For example, an application 371, 381, 531 executing on a host computer 370, 380, 530 as depicted on FIGS. 3-5, can request a physical I/E slot 320A-320F (FIG. 3), 320A-320C (FIG. 4), 420D-420F (FIG. 4), 520A-520C (FIG. 5) associated with a physical I/E station 320, 420, 520 (FIGS. 3-5) in order to perform an import or an export operation. Alternatively, an operator can enter a command that is received by the physical library 500 (FIG. 5) for a physical I/E slot.

At 840, the request is satisfied using the created slot. For example, referring to FIG. 3, assume that I/E slots 320A-320E are occupied with tapes and application 371 requests an I/E slot before application 381 requests an I/E slot. In this case, application 371 is provided the last physical I/E slot 320F and application 381 is provided one of the storage slots 310J-310L associated with application 381's I/E extension 360.

In another example, referring to FIG. 5 and table 640 on FIG. 6, assume that the physical I/E slots 520A-520C are shared, that physical I/E slot 520B is being used to satisfy an export request and that logical I/E slots (LL_ieElements) A, B and D are currently being used to satisfy three other export requests. Assume that an operator initiates a fifth export request. In this case, any one of the five I/E slots—physical I/E slots 520A and 520C, and logical I/E elements (LL_ieElements) C, E, and F—are available to satisfy the operator's initiated request. According to one embodiment, any available physical I/E slots 520A, 520C would be used to satisfy the request before using a logical I/E element to satisfy the request.

At 850, the method ends.

The following describes flowchart 800 in the context of a host application 531 requesting a physical I/E slot to perform an export using the "virtualized I/E embodiment." As depicted on FIG. 7, table 710 depicts various operations for virtually exporting a tape without requiring the tape to be physically moved. For example, table 710 depicts various operations for moving a tape from logical storage element B (LL_stElement B) to logical I/E element A (LL_ieElement A), according to various embodiments.

At 810, the method begins.

At 820, an I/E slot is created using a slot that is not a physical I/E slot. For example, table 710 on FIG. 7 depicts various operations for moving a tape from logical storage element B (LL_stElement B) to logical I/E element A (LL_ieElement A), according to various embodiments. Logical storage element and logical I/E element may also be referred to respectively as logical storage slot and logical I/E slot. LL_ieElement A and LL_stElement B are examples of logical library elements. At 715, the tape library 500 is in an initial state. As indicated in column 712, logical library storage element B (LL_stElement B) is bound to physical storage slot 510G, which contains a tape, as indicated in column 713. The logical storage element A (LL_ieElement A) is virtualized, unbound, and empty.

At 830, a request for the physical I/E slot is received. For example, referring to Table 710, at 716, a host application 531 initiated request to export the tape from logical storage element B (LL_stElement B) to logical I/E element A (LL_ieElement A) is received.

At 840, the request is satisfied using the slot that is not a physical I/E slot. In this example, the logical storage element (LL_ieElement) A is an example of a slot that is not a physical I/E slot (also known as a "non-physical I/E slot") that is used to satisfy the request for a physical FE slot. At 717, the move is completed, although virtually. The status of logical library elements A and B have been updated. Although, the tape is still in physical storage slot 510G, the status of logical storage element B (LL_stElement B) is empty and accessible (available) while the status of logical I/E element A (LL_ieElement A) is full (occupied) and accessible.

At 850, the method ends.

According to one embodiment, the tape in storage slot 510G can be moved to a physical I/E slot 520A-520C when one becomes available. Alternatively, an operator can enter the physical library 500 and remove the tape from the library 500. A tape import can be implemented by reversing the operations described in the context of table 710, for example, by unbinding a logical I/E element x from a physical slot y, virtualizing the logical I/E element x, while binding a logical storage element z to the physical slot y.

The following describes flowchart 800 in the context of an application 531 requesting a physical I/E slot to perform an export using the "virtualized I/E embodiment." As depicted in FIG. 7, table 720 depicts various operations for physically exporting a tape using various virtualized I/E embodiments. For example, table 720 depicts various operations for moving a tape from logical storage element B (LL_stElement B) to logical I/E element A (LL_ieElement A), which is bound to a physical I/E slot 520C, to facilitate operator removal of the tape, according to various embodiments.

At 810, the method begins.

At 820, an I/E slot is created using a slot that is not a physical I/E slot. For example, referring to Table 720 on FIG. 7, at 715, the tape library 500 is in an initial state. The tape is in physical storage slot 510G, as indicated by column 723. The logical storage element B (LL_stElement B) is bound to the storage slot 510G, as indicated by column 722. Logical I/E element A (LL_ieElement A) is virtualized, unbound and empty, as indicated by column 724 and physical I/E slot 520C is empty. The logical I/E element A (LL_ieElement A) is an example of the slot that is not a physical I/E slot (also known as a "non-physical I/E slot") that can be used to satisfy a request for a physical I/E slot.

At 830, a request for a physical I/E slot is received. For example, an application 531 initiated request for exporting a tape is received.

At 840, the request is satisfied using the slot that is not a physical I/E slot. For example, at 716, a move is performed from logical storage element B (LL_stElement B) to logical I/E element A (LL_ieElement A). The physical storage slot 510G still contains the tape, as indicated under column 723, and the physical I/E slot 520C is still empty, as indicated under column 725.

At 717, the move command is reported as complete. The physical storage element 510G still contains the tape, as indicated under column 723. The move command is reported as complete, for example, to the application 531 that initiated the request, even though the physical FE slot 520C is still empty, as indicated under column 725, because the tape has not actually been physically moved yet from the physical storage slot 510G to the physical I/E slot 520C. Logical storage element B (LL_stElement B), which has a status of empty and accessible, as indicated under column 722, is still bound to physical storage slot 510G; however, logical I/E element A (LL_ieElement A) is now also bound to the physical storage slot 510G and has a status of full and accessible, as indicated under column 724.

Since, according to one embodiment, a tape library 500 is configured to keep available physical I/E slots full when tapes are designated for export, at 726, the tape is physically moved from the physical storage slot 510G to the empty physical I/E slot 520C automatically. After the physical move at 726, the physical storage slot 510G is empty, as indicated under column 723, and the tape is placed in the physical I/E slot 520C, as indicated under column 725.

At 727, the logical I/E element A (LL_ieElement A) is bound to the physical I/E slot 520C and has a status of full and accessible, as indicated under column 724. The tape is now available for an operator to remove the tape from the physical I/E slot 520C as indicated at column 725 for operation 726. However, the operator does not see the export until the tape is physically moved from the physical storage slot 510G to physical I/E slot 520C.

At 728, an operator removes the tape from the physical I/E slot 520C. The status of the logical I/E element A (LL_ieElement A) is updated to unbound and empty, as indicated under column 724, and the status of the physical I/E slot 520C is updated to empty when the operator removes the tape from the physical I/E slot 520C, as indicated under column 725.

At 850, the method ends.

Therefore, according to one embodiment, a tape is physically exported from the logical storage slot B (LL_stElement B), which is bound to the first physical storage slot 510G, to a physical I/E slot 520C by binding (operation 717, column 724) the logical I/E slot A (LL_ieElement A) to the first physical storage slot 510G, physically moving (operation 726, column 725) the tape from the first physical storage slot 510G to a physical I/E slot 520C, which is empty, and rebinding (operation 727, column 724) the logical I/E slot A (LL_ieElement A) to the physical I/E slot 520C, where the tape now resides.

According to one embodiment, a physical export of a tape using various virtualized I/E embodiments can be accomplished with fewer operations than what are depicted in table 720 (FIG. 7). For example, a physical export of a tape, according to various embodiments, can be accomplished without operation 716 and by modifying operation 727 to bind the logical I/E element A (LL_ieElement A) to the physical I/E slot 520C, instead of re-binding the logical I/E element A (LL_ieElement A) to the physical I/E slot 520C. For example, according to one embodiment, a tape can be physically exported from the logical storage slot B (LL_stElementB), which is bound to the first physical storage slot 510G, to a physical I/E slot at 520C by (1) physically moving the tape from the first physical storage slot B (LL_stElement B) to an empty physical I/E slot 520C, and (2) binding the logical I/E slot A (LL_ieElement A) to the occupied physical I/E slot 520C.

In general, a tape import can be implemented by reversing the operations described in the context of Table 720, except that in some cases, once all of the logical I/E slots are used and bound to physical elements, several "virtual moves" may be used to accomplish the unbinding and rebinding of logical storage slots if moves are requested to logical elements that are already bound to occupied physical elements. Otherwise, physical tape moves may be used if there are no slot usage conflicts.

Thus, various embodiments as described in the context of flowchart 800, among other places, enable one of ordinary skill in the art to implement a tape library that provides enough I/E slots for importing and exporting tapes so that applications 371, 381, 531 can execute without interrupting the operation of the tape library and without requiring additional physical I/E slots.

Thus, flowchart 800 has been described in both the context of various I/E extension embodiments and various virtualized I/E embodiments. As would be readily apparent to any one of ordinary skill in the art from the description of various embodiments provided herein, various I/E extension embodiments and virtualized I/E embodiments may be used in combination with each other.

Various embodiments provide for transforming the state of a tape library where examples of the tape library's state include the tapes that reside in the tape library and with which slots, whether physical or virtual, the tapes are associated.

Various embodiments were described with reference to a tape. A tape is also typically referred to as a tape cartridge and is a form of removable media. Examples of a tape and removable media include tapes for a tape library, compact disks (CDs), removable disk, and Digital Video Disks (DVDs).

Computer Readable Storage Medium

Any one or more of the embodiments described herein can be implemented using computer readable storage medium and computer-executable instructions which reside, for example, in computer-readable storage medium of a computer system or like device. The computer readable storage medium can be any kind of memory that instructions can be stored on. Examples of the computer readable storage medium include but are not limited to a disk, a compact disk (CD), a digital versatile device (DVD), read only memory (ROM), flash, and so on. As described above, certain processes and steps of various embodiments of the present invention are realized, in one embodiment, as a series of instructions (e.g., software program) that reside within computer readable storage memory of a computer system and are executed by the processor of the computer system. When executed, the instructions cause the computer system to implement the functionality of various embodiments of the present invention.

A System

Figure 9:
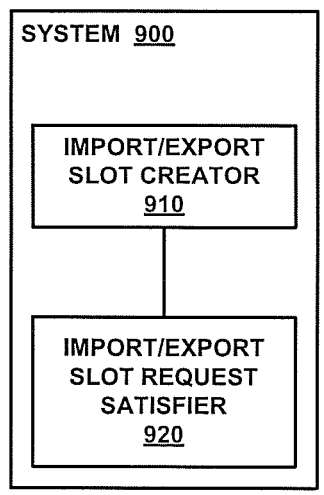
FIG. 9 depicts a system for satisfying a request for a physical I/E slot with a slot that is not a physical I/E slot, according to one embodiment.

FIG. 9 depicts a block diagram of a system for satisfying a request for a physical I/E slot with a slot that is not a physical I/E slot, according to one embodiment. The blocks that represent features in FIG. 9 can be arranged differently than as illustrated, and can implement additional or fewer features than what are described herein. Further, the features represented by the blocks in FIG. 9 can be combined in various ways. The apparatus 900 can be implemented using software, hardware, firmware, or a combination thereof.

The system 900 comprises a processor, computer readable storage medium, an import/export-slot-creator (also referred to as a "creator") and an import/export-slot-request-satisfier (also referred to as a "request satisfier"). The computer readable storage medium includes instructions that implement the creator 910 configured for creating (820) an I/E slot using a slot that is not a physical I/E slot associated with the tape library and the request satisfier 920 configured for satisfying (840) a request for a physical I/E slot using the created I/E slot using any one or more embodiments described herein. The processor executes the instructions that are stored on the computer readable storage medium. According to one embodiment, the system 900 communicates with the tape library's controller. According to one embodiment, the system 900 may be a part of or reside separately from the tape library's controller. The instructions may be stored on a computer readable storage medium, such as a hard disk, main memory, or compact disk. The compact disk may be used to install the instructions on another computer-readable storage medium, such as a hard disk or main memory, which is a part of the system.

CONCLUSION

Various embodiments provide for creating and reporting more I/E slots than what exist in a physical I/E station.

Various embodiments provide for Import/Export areas, which are shared by a plurality of applications or dedicated to one application, with sufficient I/E slots that can be configured without additional physical I/E stations, by creating extension I/E slots or virtual I/E slots, keeping the tape library footprint small and optimized.

A Virtual or extended I/E element can be dedicated to an application or shared among applications as conventional I/E station slots can be dedicated or shared, according to various embodiments.

Virtual and extended I/E element configurations allow physical I/E stations to be used for operator initiated physical insertion and removal operations to and from any logical library I/E area, according to various embodiments.

According to various embodiments, I/E elements not defined in any of a tape library's physical I/E stations allow for more reliable application initiated import and export operations, as an open I/E station door condition or an I/E station lock failure condition will not interfere or affect the application initiated, and often time sensitive, import or export operations.

According to various embodiments, user commands and/or user interfaces can be used to request the collection of exported cartridges from extended I/E areas or virtual I/E areas and have the cartridges moved to dedicated physical I/E station elements for physical operator access, without interference with an application. Extended I/E areas, according to one embodiment, include a plurality of extended I/E slots and virtual I/E areas, which according to one embodiment, include a plurality of virtual I/E slots.

According to various embodiments, user commands and/or user interfaces can be used to request the transfer of inserted cartridges from physical I/E station elements to an extended or virtual I/E area for scheduled application initiated import operations, without interference with current application initiated library operations.

Configurations of a virtual or an extended I/E area that is configured within storage elements, provides for application initiated import and export performance, as the operations complete virtually, or the element types and element addresses are just swapped, without actually physically moving a tape, according to various embodiments.

Virtual I/E area configurations allow physical I/E stations to be shared for physical insert and removal operations to and from any logical I/E slot, according to various embodiments.

A small physical I/E station can offer cartridge insert and remove capabilities into large I/E areas that are either extended or virtual, according to various embodiments.

Various embodiments can be used with a tape library that does not have any physical I/E station.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations. However, any two or more embodiments may be combined. Further, any embodiment may be used separately from any other embodiments.

What is claimed is:

1. A system comprising:
one or more tape drives that are each configured to read and write to a tape;
one or more physical storage slots that are each configured to store a tape;
one or more physical import/export (I/E) slots that are each configured to receive or eject a tape being imported into or exported out of the system;
one or more processors; and
a memory coupled to the processors comprising instructions executable by the processors, the processors being operable when executing the instructions to:
 maintain one or more logical storage elements that are each configured to be associated with one or more of the physical storage slots;
 maintain a plurality of logical I/E elements that are each configured to be associated with one or more of the physical TIE slots; and
 in response to a request by an initiator to export a particular tape stored in a particular physical storage slot that is associated with a particular logical storage element:
  identify a particular physical I/E slot;
  determine that a particular one of the plurality of logical I/E elements is available, the particular logical I/E element being available when it is not currently bound to any one of the one or more of the physical I/E slots;
  bind the particular logical I/E element with the particular physical I/E slot to which the particular tape will be transported;
  communicate, to the initiator, the particular logical I/E element bound to the particular physical I/E slot to which the particular tape will be transported; and
  cause the particular tape to be transported to the particular physical I/E slot.

2. The system of claim 1, wherein the initiator is an application.

3. The system of claim 1, wherein the processors are further configured to report a number of available I/E elements to the initiator that includes the available logical I/E elements.

* * * * *